United States Patent
Lang et al.

[11] Patent Number: 5,927,248
[45] Date of Patent: Jul. 27, 1999

[54] METHOD OF MONITORING AN OVERHEATING PROTECTIVE ARRANGEMENT DURING FULL-LOAD OPERATION OF AN INTERNAL COMBUSTION ENGINE

[75] Inventors: Ernst-Walter Lang, Gerlingen; Bernd Schott, Freiberg; Klaus Joos, Walheim, all of Germany

[73] Assignee: Robert Bosch GmbH, Stuttgart, Germany

[21] Appl. No.: 08/818,809

[22] Filed: Mar. 14, 1997

[30] Foreign Application Priority Data

Mar. 14, 1996 [DE] Germany ................... 196 09 923

[51] Int. Cl.⁶ .................. F02M 57/04; F02D 41/32
[52] U.S. Cl. ............................. 123/396; 123/676
[58] Field of Search ................... 123/681, 684, 123/676, 479, 396

[56] References Cited

U.S. PATENT DOCUMENTS

| | | | |
|---|---|---|---|
| 4,192,140 | 3/1980 | Yamashita et al. | 60/277 |
| 4,408,585 | 10/1983 | Stuckas | 123/440 |
| 4,561,403 | 12/1985 | Oyama | 123/489 |
| 4,825,836 | 5/1989 | Hirose | 123/478 |
| 5,070,832 | 12/1991 | Hapka et al. | 123/198 |
| 5,074,270 | 12/1991 | Denz et al. | 123/479 |
| 5,115,780 | 5/1992 | Jonsson et al. | 123/478 |
| 5,148,795 | 9/1992 | Nagai et al. | 123/697 |
| 5,278,762 | 1/1994 | Kawamura | 123/431 |
| 5,769,055 | 6/1998 | Motose et al. | 123/478 |

FOREIGN PATENT DOCUMENTS 63068741  5/1988  Japan.

*Primary Examiner*—Andrew M. Dolinar
*Assistant Examiner*—Arnold Castro
*Attorney, Agent, or Firm*—Walter Ottesen

[57] ABSTRACT

The invention is directed to a method for limiting the temperature of the exhaust gas of an internal combustion engine operating at high load. In the method, a first measure for reducing the exhaust-gas temperature is carried out when the engine is operating under high load. Then, a check is made as to whether this measure is effective. If the first measure is inadequately effective, then a second measure is carried out to reduce the exhaust-gas temperature.

8 Claims, 2 Drawing Sheets

1

METHOD OF MONITORING AN OVERHEATING PROTECTIVE ARRANGEMENT DURING FULL-LOAD OPERATION OF AN INTERNAL COMBUSTION ENGINE

FIELD OF THE INVENTION

The invention relates to a method for protecting an internal combustion engine and/or components in the exhaust gas flow of the engine against overheating.

BACKGROUND OF THE INVENTION

Overheating of this kind can occur during operation of the engine under high load, especially during full-load operation, because of so-called knocking combustions. In this context, it is known, for example, to detect the full-load state via the fully opened throttle flap with a throttle flap switch and to shift the composition of the air/fuel mixture supplied to the engine toward the fuel-rich end. The enrichment is characterized also as full-load enrichment. With this enrichment, the tendency of the mixture to cause knocking is reduced. An excessive development of heat associated with knocking combustions can be avoided in this manner.

In the event that this protective measure fails, comparatively costly damage to the engine or to the catalytic converter in the exhaust gas of the engine occurs. For this reason, there is an interest to be able to monitor the operation of this protective arrangement.

SUMMARY OF THE INVENTION

In view of the foregoing, it is an object of the invention to provide a method for monitoring the above protective arrangement in such a manner that it is as simple as possible, safe and reliable.

It is another object of the invention to provide such a method which requires no additional hardware components beyond components which are normally present in the system.

The method of the invention is for limiting the temperature of the exhaust gas of an internal combustion engine operating at high load. The method of the invention includes the steps of: carrying out a first measure for reducing the exhaust-gas temperature when the engine is operating under high load; checking whether the first measure is effective; and, if the first measure is inadequately effective, then carrying out a second measure for reducing the exhaust-gas temperature.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
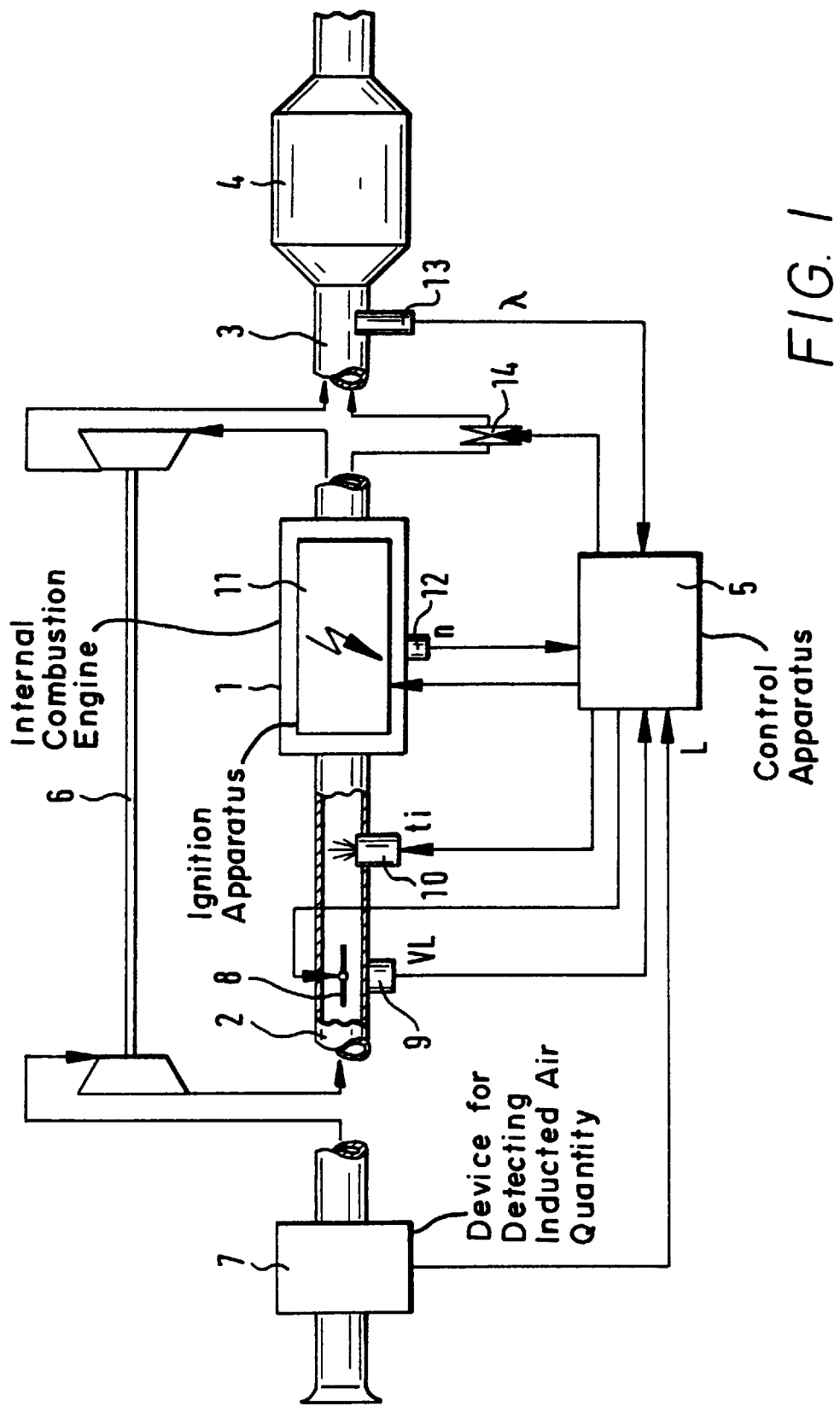
FIG. 1 is a schematic of an internal combustion engine and the equipment associated therewith to show the technical background in which the method of the invention is carried out.

FIG. 1 shows an internal combustion engine 1 having an intake pipe 2, an exhaust-gas pipe 3 equipped with a catalytic converter 4, a control apparatus 5, means for charging such as a turbocharger 6, means 7 for detecting the air quantity inducted into the engine, a throttle flap 8 equipped with a throttle flap position switch 9, fuel-metering means 10, an ignition device 11, an rpm sensor 12, an exhaust-gas measuring sensor 13, and means 14 for controlling the turbocharger.

The quantity L of the air flowing to the engine is detected by means 7 and is converted in the control apparatus 5 by logically coupling with the rpm (n), to, for example, a load signal tL standardized to the stroke of the engine. The rpm (n) is supplied by sensor 12 and the load signal tL is proportional to the quotient of L and (n).

The exhaust-gas measuring sensor 13 supplies a signal $\lambda$ from which the deviation of the composition of the air/fuel mixture (which is combusted in the engine) deviates from a desired value. From this deviation, a control positioning variable FR is formed which is, (for example, multiplicatively logically coupled with the load signal tL) a fuel-metering signal ti proportional to the product of FR and tL. The fuel-metering means 10 is driven with this fuel-metering signal. The fuel-metering means 10 can, for example, be an injection valve arrangement.

Figure 2:
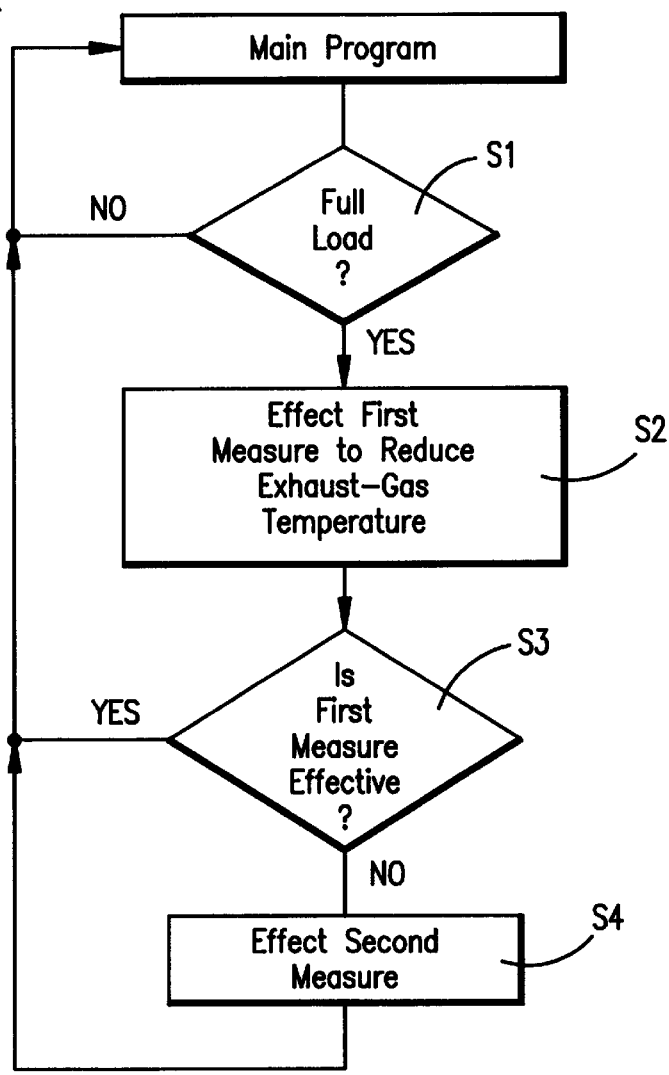
FIG. 2 shows an embodiment of the invention in the context of a flowchart.

FIG. 2 shows an embodiment of the method of the invention in the form of a flowchart of a program sequence as it is processed in the control apparatus 5. The main program coordinates the functions of the open-loop and closed-loop controls of the engine such as injection and ignition. From the main program, step S1 is reached wherein a check is made as to whether the engine is operating under a high load. This can, for example, be detected from the signal of a throttle flap switch. Another possibility is that the load signal is compared to a threshold value which marks the limit between high load and low load or considers the range of high load at high rpm as a high load range, for example, a range from a precontrol characteristic field for injection times t1 which are formed in dependence upon load and rpm. When the engine operates under high load, step S2 introduces a first measure for reducing the exhaust-gas temperature.

Step S3 checks the effectiveness of the first measure. When it is determined that the first measure is effective, there is a return into the main program. In contrast, if the first measure is not effective or is only inadequately effective, this leads to an implementation of a second measure in step S4. The first measure given in step S2 comprises, preferably, changing the composition of the air/fuel mixture processed by the engine to a rich mixture, that is, a mixture rich in fuel. A measure of this kind is reflected in the signal $\lambda$ of the exhaust-gas measuring sensor when this measure is effective.

Figure 3:
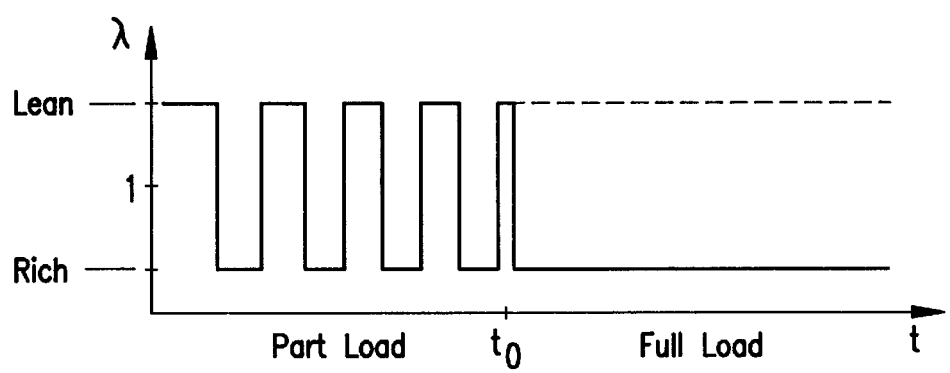
FIG. 3 shows the trace of the signal of an exhaust-gas sensor as it is used in an embodiment of the method of the invention.

FIG. 3 shows the time-dependent trace of an exhaust-gas measurement-sensor signal in the part-load operation ($t<t_0$) and full-load operation ($t>t_0$) wherein enrichment functions properly. Starting with the transition from part load to full load at time point $t_0$, the solid line in FIG. 3 signalizes a rich mixture and thereby shows the effectiveness of the enrichment as the first measure.

In contrast, the broken line signalizes a lean mixture and thereby that the enrichment as a first measure in the full-load range is inadequately effective.

One possible reason for this is a constriction of the fuel system by foreign bodies or dirt, or another reason is the malfunction of a fuel pump where several fuel pumps pump in parallel. In both cases, the additional fuel, which is needed for enrichment beyond the actual full-load requirement, can no longer be supplied by the system. This, therefore, results in a leaning of the mixture as shown which, for example, can be determined by the position of λ-signal relative to the value λ=1.

For an inadequate effect of the first measure, a second measure can, as an example, be implemented in accordance with step S4 with which the power of the engine is reduced. The maximum opening angle of the throttle flap can be reduced in the case of a system equipped with an electronic accelerator pedal (EGAS-system). The EGAS-system pertains to a configuration wherein, for example, the connection from the accelerator pedal to the throttle flap of the engine is not mechanical but is via an electronic circuit so that the throttle flap is actuated electrically.

For a charged engine, the effect of the charge can be reduced. For example, for a turbo engine, the charging pressure is reduced. Both measures reduce the quantity of the air inducted by the engine and therefore also the quantity of the fuel to be metered and therefore, finally, the heat generated during combustion.

A check with an exhaust-gas temperature probe can be used as an alternative to checking the effectiveness of the first measure with an exhaust-gas composition probe. The check with the aid of an exhaust-gas composition probe is, however, advantageous because it is already present in the system and therefore the method of the invention can be carried out without additional hardware components.

It is understood that the foregoing description is that of the preferred embodiments of the invention and that various changes and modifications may be made thereto without departing from the spirit and scope of the invention as defined in the appended claims.

What is claimed is:

1. A method for limiting the temperature of the exhaust gas of an internal combustion engine developing power and operating at high load, the method comprising the steps of:

carrying out a first measure for reducing the exhaust-gas temperature when said engine is operating under high load by changing the composition of the air/fuel mixture to make said air/fuel mixture richer;

checking whether said first measure is effective; and, if said first measure is inadequately effective, then carrying out a second measure for reducing the exhaust-gas temperature by reducing said power of said engine.

2. The method of claim 1, wherein the method further comprises: the step of checking the reaction of an exhaust-gas probe to determine the effect of the change in said composition, the signal of said exhaust-gas probe being a criterion for the composition of said air/fuel mixture.

3. The method of claim 1, wherein a quantity of air is inducted into said engine during the operation thereof and said method comprising the further step of reducing said quantity of said air inducted by said engine.

4. The method of claim 3, wherein said engine is equipped with a charger and said method comprising the further step of reducing the amount of the charge supplied to said engine.

5. The method of claim 1, comprising the further step of: effecting said step of changing said composition of said air/fuel mixture by measuring the temperature of said exhaust gas.

6. The method of claim 3, wherein said engine includes a throttle flap having a maximum throttle flap opening angle and a system equipped with an electronic accelerator pedal; and, said method comprising the further step of reducing said maximum throttle flap opening angle.

7. The method of claim 1, wherein said engine can operate at a maximum rpm; and, said method comprising the further step of reducing said maximum rpm.

8. The method of claim 1, wherein said engine can operate at a maximum rpm and includes: a charger, a throttle flap having a maximum throttle flap opening angle; and, a system equipped with an electronic accelerator pedal; and, said method comprising at least two of the following further steps:

(a) reducing the amount of the charge supplied to said engine;

(b) reducing said maximum throttle flap opening angle; and, (c) reducing said maximum rpm.

* * * * *